United States Patent

Hashimoto

(10) Patent No.: US 8,264,657 B2
(45) Date of Patent: Sep. 11, 2012

(54) LIQUID CRYSTAL DISPLAY PANEL AND METHOD OF MANUFACTURING THE SAME

(75) Inventor: Yoshiaki Hashimoto, Kanagawa (JP)

(73) Assignee: NLT Technologies, Ltd., Kanagawa (JP)

( * ) Notice: Subject to any disclaimer, the term of this patent is extended or adjusted under 35 U.S.C. 154(b) by 218 days.

(21) Appl. No.: 12/860,279

(22) Filed: Aug. 20, 2010

(65) Prior Publication Data

US 2010/0314045 A1      Dec. 16, 2010

Related U.S. Application Data

(62) Division of application No. 11/638,472, filed on Dec. 14, 2006, now Pat. No. 7,812,916.

(30) Foreign Application Priority Data

Dec. 27, 2005   (JP) .................................. 2005-376091

(51) Int. Cl.
  *G02F 1/1333*    (2006.01)
  *G02F 1/1335*    (2006.01)
  *G02F 1/1339*    (2006.01)

(52) U.S. Cl. ......... 349/155; 349/106; 349/110; 349/156

(58) Field of Classification Search .................. 349/106, 349/110, 155, 156
  See application file for complete search history.

(56) References Cited

U.S. PATENT DOCUMENTS

| | | | |
|---|---|---|---|
| 5,307,190 A | | 4/1994 | Wakita et al. |
| 6,259,500 B1 * | | 7/2001 | Kijima et al. ................ 349/113 |
| 6,335,779 B1 | | 1/2002 | Morii et al. |
| 6,515,721 B2 | | 2/2003 | Jin et al. |
| 6,642,988 B2 | | 11/2003 | Matsuyama et al. |
| 6,738,125 B2 | | 5/2004 | Yamada et al. |
| 7,423,717 B2 | | 9/2008 | Kadotani |
| 2005/0231564 A1 * | | 10/2005 | Nakamura et al. .............. 347/80 |
| 2006/0109549 A1 * | | 5/2006 | Shimizu ........................ 359/457 |
| 2006/0181667 A1 | | 8/2006 | Doi et al. |
| 2007/0236645 A1 | | 10/2007 | Hashimoto |
| 2008/0297704 A1 | | 12/2008 | Hashimoto |
| 2009/0086136 A1 | | 4/2009 | Seo et al. |
| 2011/0001915 A1 * | | 1/2011 | Kawazoe ...................... 349/155 |

FOREIGN PATENT DOCUMENTS

| | | |
|---|---|---|
| CN | 1308309 | 8/2001 |
| CN | 1356586 | 7/2002 |
| JP | 63-287824 | 11/1988 |
| JP | 01055532 | 3/1989 |
| JP | 2-074920 | 3/1990 |

(Continued)

OTHER PUBLICATIONS

Japanese Office Action Dated Mar. 4, 2011 With English Translation.

(Continued)

*Primary Examiner* — Huyen Ngo

(74) *Attorney, Agent, or Firm* — Young & Thompson

(57) ABSTRACT

A spherical spacer is used as a spacer member defining a gap, and is fixed to a color filter substrate. A concave portion coming in contact with a part of the spherical spacer is formed in a position in a TFT substrate, the position being opposite to the spherical spacer. The substrates are bonded with each other by engaging the spherical spacer and the concave portion with each other.

14 Claims, 8 Drawing Sheets

FOREIGN PATENT DOCUMENTS

| | | |
|---|---|---|
| JP | 04243230 | 8/1992 |
| JP | 6-43468 | 2/1994 |
| JP | 8-828201 | 3/1996 |
| JP | 8-286192 | 11/1996 |
| JP | 9-197412 | 7/1997 |
| JP | 2000-180866 | 6/2000 |
| JP | 2000-235188 | 8/2000 |
| JP | 2001-66606 | 3/2001 |
| JP | 2001-83906 | 3/2001 |
| JP | 2001-255538 | 9/2001 |
| JP | 2002-214619 | 7/2002 |
| JP | 2003-121859 | 4/2003 |
| JP | 2004-205549 | 7/2004 |

OTHER PUBLICATIONS

CN Office Action issued Mar. 30, 2011, Application No. 200610156792.7.

Chinese Patent Office issued a Chinese Office Action dated Jun. 5, 2009, Application No. 200610156792.7.

* cited by examiner

LIQUID CRYSTAL DISPLAY PANEL AND METHOD OF MANUFACTURING THE SAME

CROSS REFERENCE TO RELATED APPLICATIONS

This application is a division of co-pending application Ser. No. 11/638,472 filed on Dec. 14, 2006, which claims foreign priority to Japanese patent application No. 2005-376091. The contents of each of these applications are hereby expressly incorporated by reference.

BACKGROUND OF THE INVENTION

1. Field of the Invention

The present invention relates to a liquid crystal display (LCD) panel and a method of manufacturing the same, and particularly relates to an LCD panel capable of achieving excellent control of a cell gap and a method of manufacturing the same.

2. Description of the Related Art

As a display device of Audio and Visual (AV) equipment or Office Automation (OA) equipment, an LCD device is widely used due to its advantages such as a thin shape, a light weight and low power consumption. This LCD device includes an LCD panel in which a liquid crystal layer is held between a first substrate and a second substrate. On the first substrate, switching elements such as Thin Film. Translators (TFT) are formed in a matrix form (hereinafter referred to as a TFT substrate), and on the second substrate, a color filter (CF), a black matrix (BM) and the like are formed (hereinafter referred to as a CF substrate). By controlling an alignment direction of liquid crystal molecules by an electric field generated between electrodes provided in one or both substrates, light transmittance is changed to display inputted information.

In order to improve the display quality of this LCD panel, it is important to control a gap (a cell gap) between the TFT substrate and the CF substrate. In general, spacer members each having predetermined shape and size are arranged between the substrates.

In addition, in a general LCD panel, by a black matrix (BM), light is shielded from entering alignment defective regions between adjacent pixels. For this reason, it is important to precisely superpose two opposite substrates within a standard so that the alignment defective regions can be fit within the BM regions. When the degree of precision in the superposing two substrates is below the standard, light is not shielded from entering the alignment defective regions and the alignment defective regions where light is not shielded from entering, glows at the time of black display, thereby causing display defect.

In particular, as a substrate is recently becoming larger, it is becoming more difficult to superpose two substrates opposite to each other uniformly and precisely in wide regions of the whole substrates. In addition, due to the demand for further fineness, a design margin for superposing two substrates opposite to each other becomes smaller, and the above-described problem becomes more obvious.

SUMMARY OF THE INVENTION

Accordingly, an exemplary feature of the invention is to provide an LCD panel, in which substrates opposite to each other are easily aligned and light leakage due to misalignment is hardly caused, and to provide a method of manufacturing the same.

An LCD panel of the present invention is provided with a pair of substrates opposite to each other, which hold a liquid crystal layer therebetween. A substantially spherical spacer is fixed to a first one of the substrates, and a concave portion is formed in a position in a second one of the substrates, the position being opposite to the spacer.

It is preferable that the pair of the substrates be fixed in a state where the spacer and the concave portion are engaged with each other.

It is preferable that the concave portion have a side wall portion inclined at a predetermined angle to a plane of the second substrate and a cross-section of the concave portion in a direction substantially perpendicular to the plane be V-shaped.

It is preferable that the concave portion have a stepped shape in which an area of an aperture becomes gradually smaller toward a bottom.

It is preferable that an insulating film be formed in the second substrate and the concave portion be formed by removing a part of the insulating film.

It is preferable that the concave portion penetrate the insulating film and a ground of the insulating film be exposed to the outside.

It is preferable that the insulating film be a photosensitive organic film and at least a part of the concave portion be formed of a curve surface.

It is preferable that the spacer be fixed to the first substrate by an adhesive member.

It is preferable that a black matrix layer shields light from entering interstices between a plurality of pixels be formed on the first substrate and the spacer be fixed over the black matrix layer.

A method of manufacturing an LCD panel of the present invention is a method of manufacturing an LCD panel including a pair of substrates opposite to each other, which hold a liquid crystal layer therebetween. The method includes steps of: fixing a substantially spherical spacer to a first one of the substrates; forming a concave portion in a position in a second one of the substrates, the position being opposite to the spacer; and bonding the pair of the substrates with each other in a state where the liquid crystal layer is held therebetween.

It is preferable that the pair of the substrates be bonded with each other in a state where the spacer and the concave portion are engaged with each other.

It is preferable that the bonding step include a step of superposing the pair of the substrates in a state where the spacer and the concave portion are engaged with each other and then aligning the pair of the substrates with each other.

It is preferable that the concave portion have a side wall portion inclined at a predetermined angle to a plane of the second substrate and a cross-section of the concave portion in a direction substantially perpendicular to the plane be V-shaped.

It is preferable that the concave portion have a stepped shape in which an area of an aperture becomes gradually smaller toward a bottom surface.

It is preferable that an insulating film be formed in the second substrate and the concave portion be formed by removing a part of the insulating film.

It is preferable that the concave portion penetrate the insulating film and a ground of the insulating film be exposed to the outside.

It is preferable that the insulating film be a photosensitive organic film and at least a part of the concave portion be formed of a curved surface.

It is preferable that the fixing step includes a step of coating the first substrate with an adhesive member and a step of fixing the spacer to the adhesive member.

It is preferable that a black matrix layer shielding light from entering interstices between a plurality of pixels is formed on the first substrate and the spacer is fixed to an upper portion of the black matrix layer.

It is preferable that the substantially spherical spacer is fixed to the first substrate, followed by forming an alignment film over the first substrate.

It is preferable that an alignment film is formed over the first substrate, followed by fixing the substantially spherical spacer to the first substrate.

In this manner, in the present invention, a substantially spherical spacer is fixed to the first substrate configuring an LCD panel, and a concave portion is provided in a portion on the second substrate, the portion being opposite to the spacer. With this, friction resistance at the time of contact is reduced so that the substrates opposite to each other can be easily aligned. In addition, by engaging the spacer and the concave portion with each other, misalignment at the time of transportation or the curing of a sealant can be suppressed. Therefore, light leakage due to the misalignment can be surely prevented. Moreover, the substantially spherical spacer is used as a spacer, which is excellent in elasticity as compared with a columnar spacer. With this, a diameter of the spacer member can be enlarged by the depth of the concave portion. Accordingly, a margin for a gap change is widened, so that gap irregularity due to temperature change can be surely prevented.

According to the LCD panel and a method of manufacturing the same of the present invention, the following effects can be obtained.

A first effect of the present invention is that first and second substrates opposite to each other can be easily aligned. When the two substrates are superposed, an alignment operation is carried out in a position where the two substrates opposite to each other are very adjacent and the final alignment operation is carried out in a state that the two substrates are at least partially brought into contact. In the present invention, a spherical spacer is fixed to the first substrate and a concave portion is provided in the second substrate. With this, friction resistance at the time of contact can become sufficiently small, and positions of the two substrates opposite to each other can be corrected in a self-aligned manner. Therefore, alignment can be easily carried out with high precision.

A second effect of the present invention is that light leakage due to misalignment can be surely prevented. The reason is as follows. The spherical spacer is engaged with the concave portion at the time of the alignment operation. Accordingly, the two substrates opposite to each other can be superposed with high precision by designing a gap between the spherical spacer and the concave portion with superposing precision by which the light leakage is prevented.

In addition, even when the two substrates opposite to each other are superposed with high precision, misalignment is caused thereafter by flexure of a substrate or the like during transportation to a sealant curing system or during seal curing processing. For this reason, temporary fixing is conventionally carried out by photo-curing just after substrates are superposed. In contrast, in the present invention, since the spherical spacer and the concave portion are engaged with each other, misalignment in a direction parallel to surfaces of substrates can be suppressed.

A third effect of the present invention is that gap irregularity due to temperature change can be surely prevented. In an LCD panel, a liquid crystal layer expands when the temperature of the product increases. This causes gap irregularity since a cell gap becomes larger. For this reason, an amount of crushing spacer members is conventionally determined in consideration of thermal expansion amount within a guaranteed temperature range. As a result of this, a gap of a product is made narrower. Accordingly, a spacer is plastically deformed in a case where the amount of crushing spacer members more than the limit of elastic change of the material is required. This plastic deformation causes gap irregularity due to incapability of dealing with the change in the cell gap when temperature increases. In contrast, in the present invention, the spherical spacer, which is excellent in elasticity as compared with a columnar spacer, is used as a spacer, and a portion with which the spherical spacer comes in contact is made concave. Accordingly, a size of the spacer can be enlarged by the depth of the concave portion, so that a large amount for elastic deformation can be dealt with. As a result of this, change in the gap due to temperature change can be effectively absorbed.

BRIEF DESCRIPTION OF THE DRAWINGS

These and other objects and advantages and further description of the invitation will be more apparent to those skilled in the art by reference to the description, taken in connection with the accompanying drawings, in which.

DETAILED DESCRIPTION OF THE PREFERRED EMBODIMENTS

Figure 8:
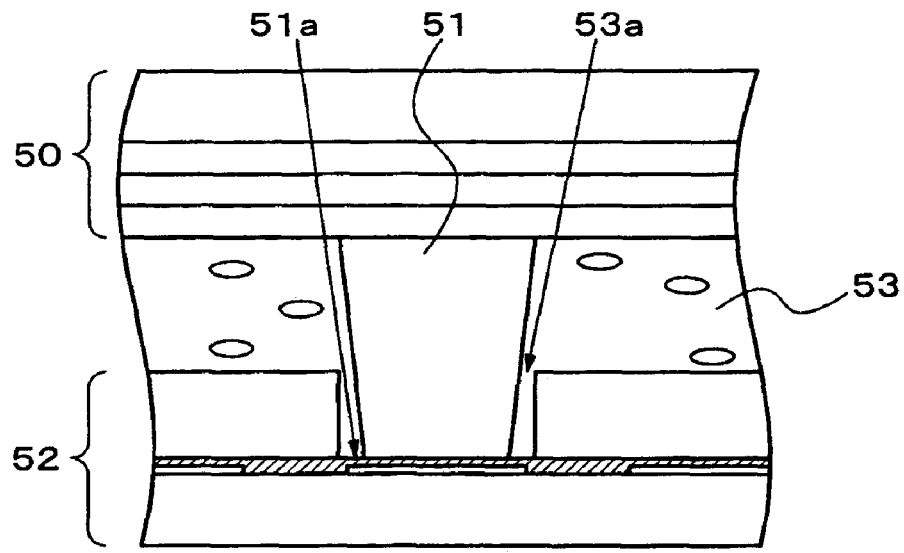
FIG. 8 is a cross-sectional view showing a structure of an LCD panel of a first related art.

Before describing preferred embodiments of the present invention, an LCD panel of the related art will be described in detail. Firstly, a cell gap control structure of a first related art will be described. In Japanese Patent Application Laid-open No. 2003-121859, proposed is an LCD panel as shown in FIG. 8. In the LCD panel, columnar spacers 51 are provided on a CF substrate and apertures 53a are provided in an interlayer insulating film 53 in a TFT substrate 52. The interlayer insulating film 53 is formed of an organic material, and each of the apertures 53a is located so as to correspond a position of the columnar spacer 51. Each of the columnar spacers 51 is supported by a contact portion 51a of the columnar spacer 51 within the corresponding aperture 53a, so that defects such as abnormal display are prevented, which are easily caused when the cell gap locally expands under a high temperature.

Figure 9:
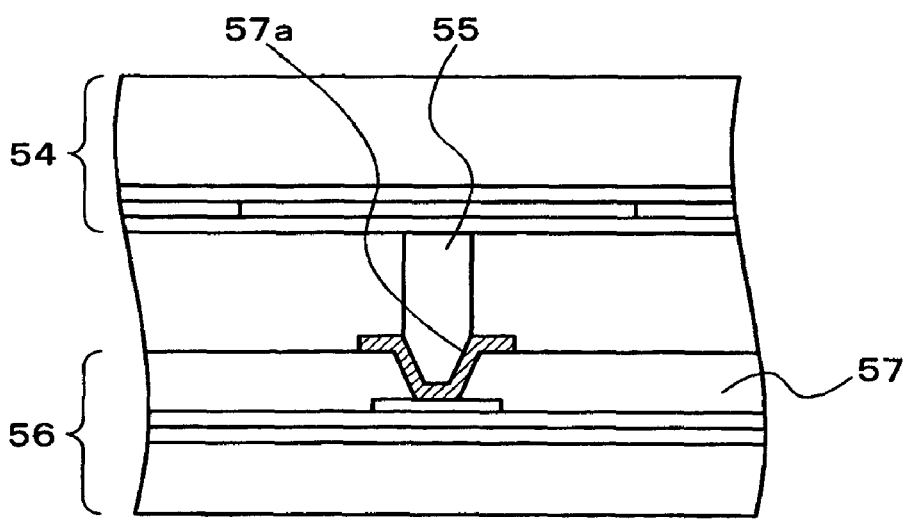
FIG. 9 is a cross-sectional view showing a structure of an LCD panel of a second related art.

Moreover, a cell gap control structure of a second related art will be described. In Japanese Patent Application Laid-open No. 2004-205549, proposed is an LCD panel as shown in FIG. 9. In the LCD panel, contact holes 57a are provided in a planarizing film 57 in an array substrate 56, and columnar spacers 55 each having a diameter less than the maximum diameter of the contact hole 57a are provided on an opposite substrate 57 respectively in positions corresponding to the contact holes 57a. Each of the columnar spacers 55 is pressed fit into the corresponding contact hole 57a, so that display defects due to gap irregularity by finger pressing or the like are prevented.

For an LCD panel, it is important to control a cell gap for the purpose of improving its display quality. However, in the LCD panel of the second related art, clearance between the columnar spacer 55 and the contact hole 57a into which the columnar spacer 55 is pressed fit is very small. For this reason, in a case where substrates 54 and 56 opposite to each other cannot be superposed with all the columns therebetween with high precision, the columnar spacer 55 protrudes to the outside of the contact hole 57a. In this case, the columnar spacer 55 supports a portion other than the contact hole 57a. Accordingly, necessary cell gaps cannot be obtained, and thus a gap defect is locally caused.

In addition, in a general LCD panel, light is shielded from entering alignment defective regions between adjacent pixels by a black matrix (BM). For this reason, it is important that two substrates opposite to each other are precisely superposed within a standard so that the alignment defective region can be fit in the BM region. At the time of the superimposing, an operation of alignment is carried out in a state where the two substrates opposite to each other are superposed. However, in the LCD panels of the first and second related arts, the columnar spacers are used as a spacer member, and a top portion of each columnar spacer has a planar and wide touch area, and thus large friction resistance is caused. For this reason, large power is needed at the time of the operation of alignment in a state where the substrates are superposed. Accordingly, the operation of alignment becomes difficult to be precisely carried out, and thus the degree of precision of the superposing decreases.

Figure 10A:
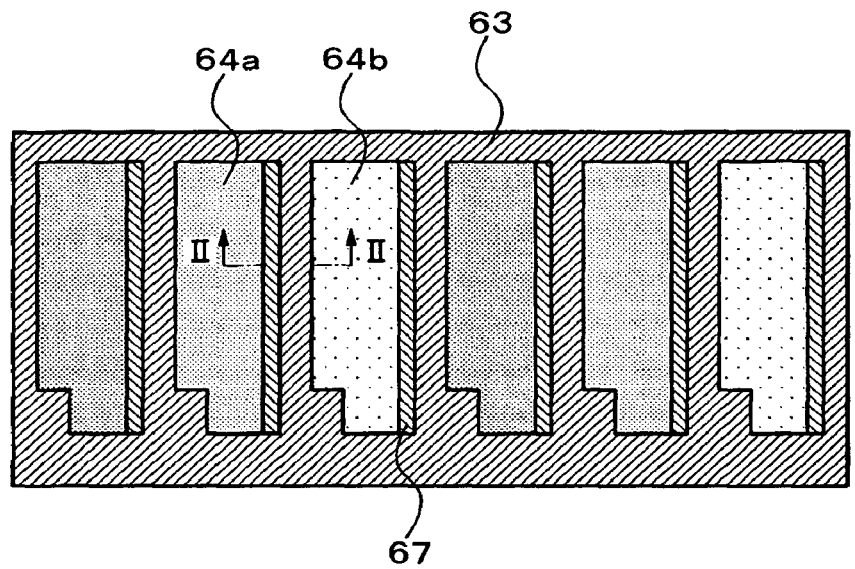
FIGS. 10A and 10B are respectively a plan view and a cross-sectional view for describing problems in the LCD panels of the related arts.
Figure 10B:
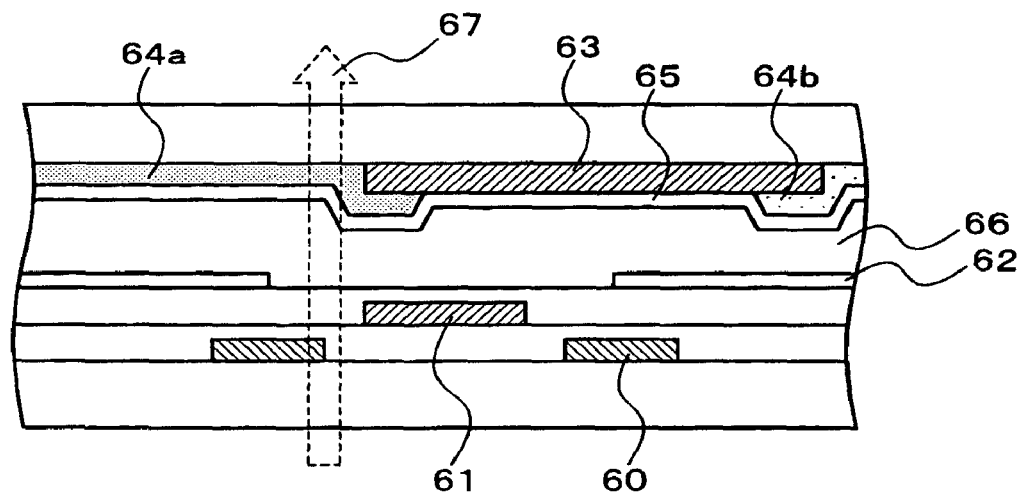

FIGS. 10A and 10B show an LCD panel in which a liquid crystal layer 66 is held between an array substrate and a CF substrate. In the array substrate, gate wirings 60, drain wirings 61, and pixel electrodes 62 are formed. In the CF substrate, a black matrix 63, color layers 64a and 64b, and an opposite electrode 65 are formed. When the degree of precision of superposing the array substrate and the CF substrate is below the standard, as shown in FIGS. 10A and 10B, light is not shielded from entering the alignment defective regions. That is, when the LCD panel is black-displayed, leak light 67 transmits the LCD panel and these alignment defective regions where light is not shielded from entering, glows, thereby causing display defect. Such display defect is referred to as light leakage display defect. Recently, in particular, as a substrate becomes larger, it becomes difficult that two opposite substrates are uniformly and precisely superposed in a wide region of the whole substrates. In addition, due to the demand for further fineness, a design margin for the superposing becomes smaller and the above-described problem is more obvious.

Recently, although a product with narrower gap is also demanded, gap irregularity is easily caused in an LCD panel, due to change in the volume of a liquid crystal layer associated with temperature change. However, in the LCD panels of the above-described first and second related arts, the columnar spacers are used as a spacer member, and the gap change cannot be effectively reduced by a columnar material with small elastic force. For this reason, it is difficult to satisfy the demand for a product with narrower gap, which requires gap management with high precision.

Accordingly, in the present invention, an LCD panel having a liquid crystal layer held between a pair of opposite substrates is characterized in that spherical spacers are used as a spacer member defining a gap. Each of these spherical spacers is fixed respectively to a predetermined position on first substrate by a predetermined method, and concave portions each coming in contact with one portion of the corresponding spherical spacer are formed respectively in positions on the second substrate, the positions being opposite to the spherical spacers. In this manner, friction resistance at the time of the contact is absorbed by using the spherical spacer, so that the substrates are easily aligned with respect to each other. Moreover, the spherical spacer and the concave portion are engaged with each other, so that misalignment at the time of the superposing and at the time of transporting or thermosetting from the time of the superposing to the seal curing is surely prevented, and the generation of light leakage display defect due to the misalignment is surely prevented. Furthermore, the change in the gap is effectively absorbed by making the spacer member spherical and by causing a diameter of each spherical spacer to be larger by the depth of the concave portion. Accordingly, the generation of the gap irregularity due to temperature change is surely prevented.

Figure 1A:
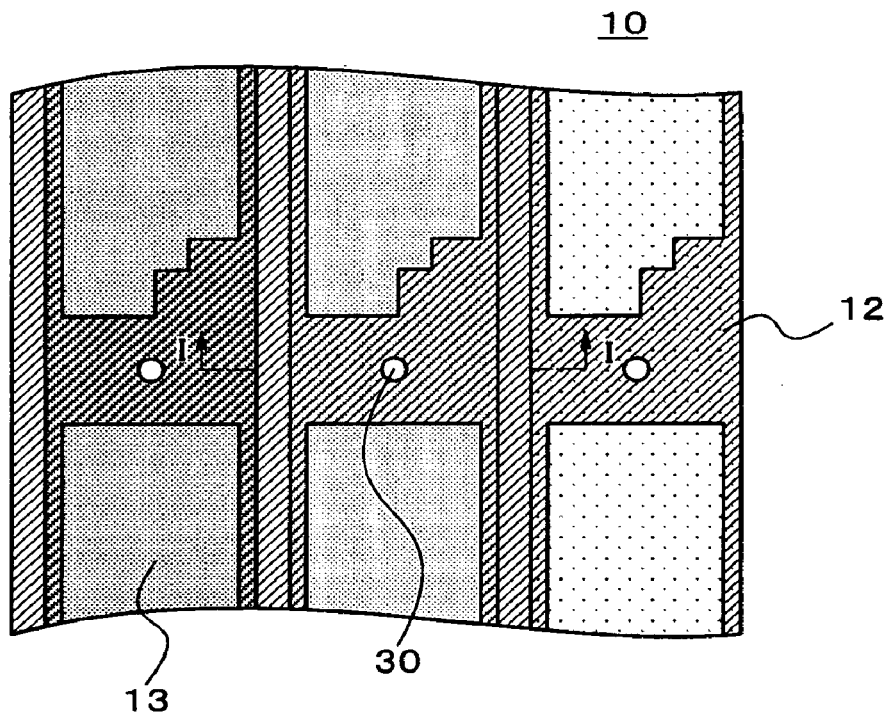
FIG. 1A is a plan view schematically showing a color filter substrate (CF substrate) of an LCD panel according to an embodiment of the present invention.
Figure 1B:
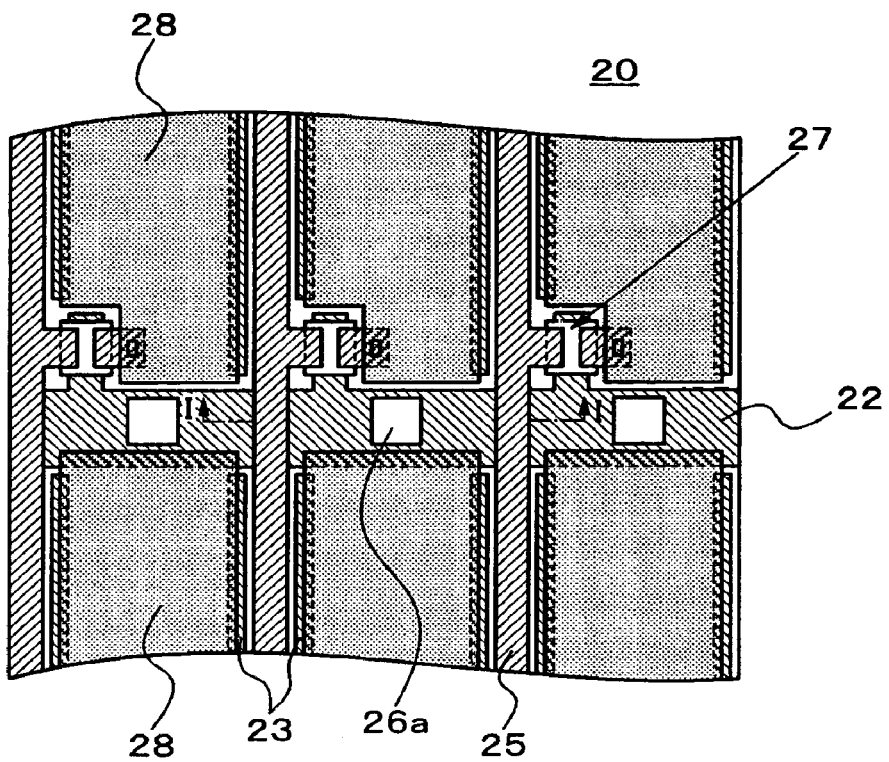
FIG. 1B is a plan view schematically showing a TFT substrate of the LCD panel according to the embodiment of the present invention.
Figure 1C:
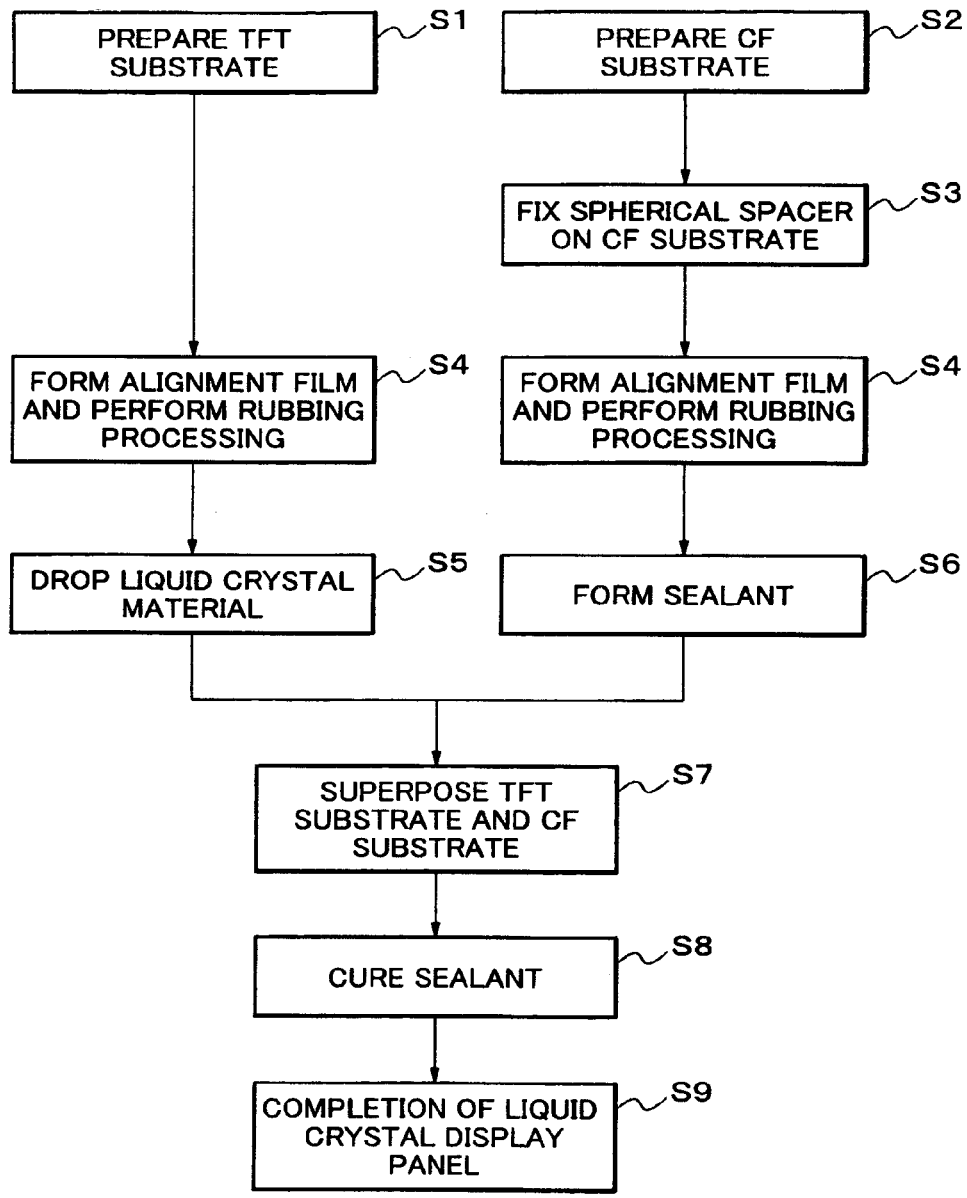
FIG. 1C is a flowchart for describing a method of manufacturing the LCD panel of the embodiment of the first present invention.
Figure 1D:
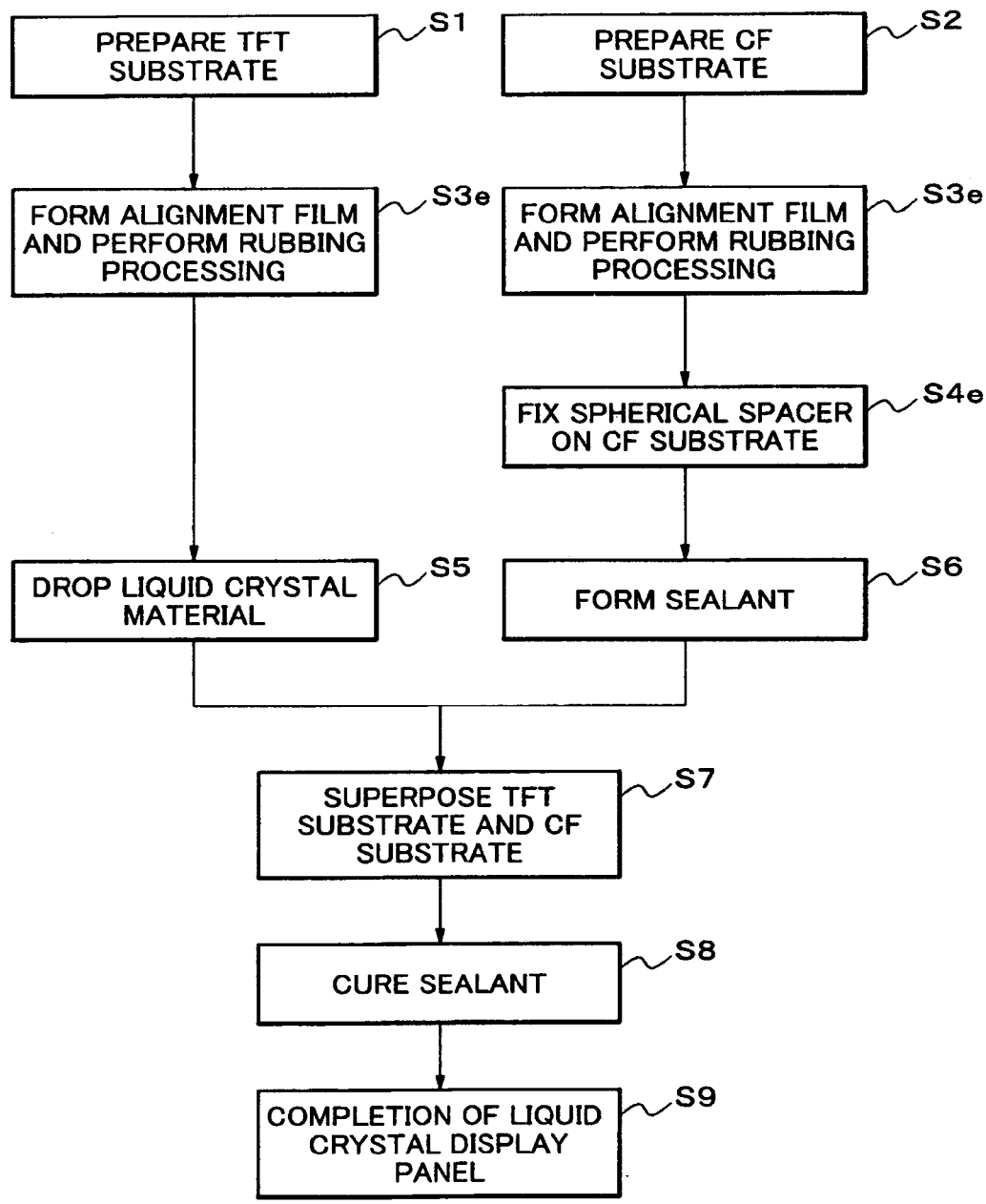
FIG. 1D is a flowchart for describing modified method of manufacturing the LCD panel of the embodiment of the first present invention.
Figure 2:
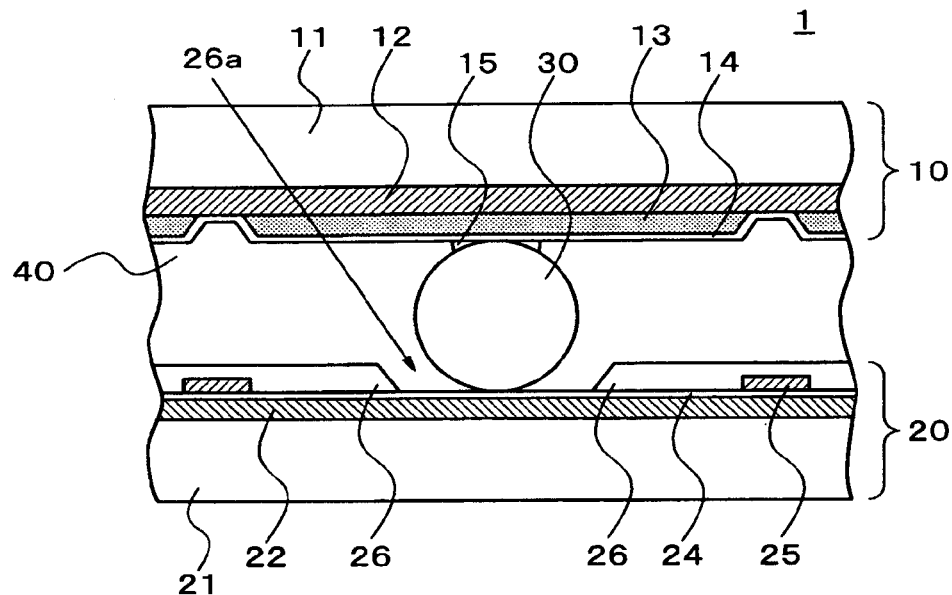
FIG. 2 is a cross-sectional view schematically showing a first structure of an LCD panel according to an exemplary embodiment of the present invention.

An LCD panel and a method of manufacturing the same according to an exemplary embodiment of the present invention will be described by referring to FIGS. 1A, 1B, 1C to 7. As shown in FIGS. 1A, 1B, and 2, an LCD panel of the present embodiment is provided with a TFT substrate 20, a CF substrate 10, substantially spherical spacer members (hereinafter, referred to as a spherical spacers 30) and a liquid crystal layer 40. In the TFT substrate 20, switching elements such as TFTs are formed in a matrix form. The CF substrate 10 is provided opposite to the TFT substrate 20. The spherical spacers 30 are arranged between the TFT substrate 20 and the CF substrate 10. The liquid crystal layer 40 is held between the TFT substrate 20 and the CF substrate 10 with the gap defined by the spherical spacers 30.

The CF substrate 10 is configured of a transparent insulator substrate such as glass or plastic (it is set to a glass substrate 11), a black matrix layer 12 for shielding light, a color layer 13 for carrying out color display, a counter pixel electrode 14 for generating an electric field with a pixel electrode 28 formed on the TFT substrate 20, and the like. The spherical spacers 30, each of which is formed of a polymer bead, a silica bead or the like, are fixed respectively to predetermined positions on the black matrix layer 12.

In addition, the TFT substrate 20 is formed of a transparent insulator substrate such as glass or plastic (which is to be a glass substrate 21), a gate wiring 22, gate light-shielding portions 23, a gate insulating film 24 on an upper layer of the gate light-shielding portions 23, a drain wiring 25, an insulating film 26 on an upper layer of the drain wiring 25, a TFT 27, a pixel electrode 28 and the like. The gate wiring 22 is connected with a gate electrode of each of the TFTs 27 which is formed of amorphous silicon, polycrystalline silicon, or the like. The gate light-shielding portions 23 for shielding light in the periphery of the pixel are formed in the same layer as that of the gate wiring 22. The drain wirings 25 are connected with a drain electrode of each of the TFTs 27. The pixel electrodes 28 are connected with a source electrode of each of the TFTs 27. Concave portions 26a, each of which is formed by partially removing the insulating film 26, are provided respectively in regions of the TFT substrate 20 coming in contact with the spherical spacers 30 when the two substrates opposite to each other are superposed. In the present embodiment, as shown in FIG. 2, each of the concave portions 26a has a size larger than that of the spherical spacer 30. Each of the concave portions 26a are formed in the insulating film 26 between corresponding two of a plurality of the pixel electrodes 28 adjacent along a direction in which the drain wiring 25 extends. In FIG. 1B, the concave portions 26a are rectangular.

It is to be noted that each of the spherical spacers 30 is not necessary strictly spherical, but may be a somehow deformed ellipse. The material thereof is also not limited to polymer beads or silica beads. In addition, in FIGS. 1A and 1B, the spherical spacer 30 is arranged one by one between pixels adjacent in a lateral direction in the figure. However, the arrangement and number of the spherical spacer 30 are not limited to the configuration shown in the figures. The spherical spacer 30 may be arranged between pixels adjacent in a longitudinal direction, or it is also possible that a plurality of the spherical spacers 30 are arranged between corresponding two pixels. Otherwise, it is also possible that one spherical spacer 30 is arranged for each of the plural pixels. In addition, the concave portion 26a is rectangular in FIG. 1B. However, the concave portion 26a may be any shape as long as it engages with the spherical spacer 30. For example, it may be triangular, polygonal, elliptic, or the like.

In addition, in FIGS. 1A, 1B, and 2, shown is a Twisted Nematic (TN) type LCD panel in which a liquid crystal is driven by an electric field between the pixel electrode 28 which is formed on the TFT substrate 20, and the counter pixel electrode 14 opposite to the pixel electrode 28, which is formed on the CF substrate 10. However, it may be an In-Plane Switching (IPS) type LCD panel in which a liquid crystal is driven by an electric field between electrodes formed on the TFT substrate 20. In this case, the pixel electrode and a common electrode for driving the liquid crystal are formed on the TFT substrate, and therefore the counter pixel electrode 14 on the CF substrate 10 is unnecessary. In addition, in FIG. 2, the TFT is an inversely-staggered type (bottom gate type), but it may be a normally-staggered type (top gate type). As for components other than the spherical spacer 30 and the concave portion 26a, shapes, arrangement and materials thereof are not particularly limited.

Next, a method of manufacturing an LCD panel 1 of an embodiment of the present invention will be described by referring to FIG. 1C. Firstly, in Step S1, a TFT substrate 20 is prepared. That is, a gate wiring 22 is formed on a glass substrate 21 by using a sputtering method or the like. At this time, gate light-shielding portions 23 for shielding leak light from the periphery of the pixel are formed at the same time. Next, a gate insulating film 24 formed of a silicon oxide film, a silicon nitride film or the like is formed by using a vacuum evaporation method, a plasma-enhanced CVD method or the like, and a semiconductor layer formed of amorphous silicon, polycrystalline silicon or the like is formed thereon. Furthermore, drain wirings 25 are formed by using the sputtering method or the like. Next, an insulating film 26 formed of a photosensitive organic layer, a silicon oxide film, a silicon nitride film or the like is formed by using a spreading method, a vacuum evaporation method, the plasma-enhanced CVD method or the like. Concave portions 26a are formed in the insulating film 26 by using a photolithography technique, or an etching technique. These concave portions 26a come in contact with the corresponding spherical spacers 30 when the two substrates opposite to each other are superposed. After that, pixel electrodes 28 formed of Indium Tin Oxide (ITO) or the like are formed by using the sputtering method or the like. It is to be noted that a material, a forming method, a forming region, the thickness of each of the gate wiring 22, the gate light-shielding portions 23, the gate insulating film 24, the semiconductor layer, the drain wirings 25, and the pixel electrodes 28 are not particularly limited. In this manner, the TFT substrate is completed.

Next, in Step S2, the CF substrate 10 is prepared. That is, in a region between pixels on the glass substrate 11, the black matrix layer 12 is formed by using the photolithography technique, and thereafter a color layer 13 for each of RGB colors is formed in each of the pixel regions by using the photolithography technique. Furthermore, a counter pixel electrode 14 formed of ITO or the like is formed by using the sputtering method or the like. In this manner, the CF substrate 10 is completed.

Next, in Step S3, the spherical spacers 30 are fixed to the CF substrate 10. Here, each of the spherical spacers 30 is fixed to the counter pixel electrode 14 in a predetermined position where light is shielded from entering by the black matrix layer 12. One example of methods of fixing the spherical spacers 30 will be described. For example, thermosetting adhesive members 15 are printed respectively in predetermined positions where the spherical spacers 30 are to be fixed, by the intaglio printing method or ink-jet printing method. The predetermined positions are positions where light is shielded from entering by the black matrix layer 12, as described above. Next, the spherical spacers 30 are sprayed on the CF substrate 10 by the dry spraying. With this, the spherical spacers 30 adhere respectively to the portions where the adhesive members 15 are printed. Next, the spherical spacers 30, each sprayed on the portion where the adhesive members 15 does not adhere, are removed by a vacuum cleaner or the like. Furthermore, the spherical spacers 30 are fixed to the CF substrate 10 by curing the adhesive members 15 by the heating processing. It is to be noted that a material, a forming method, a forming region, thickness and the like of each of the black matrix layer 12, the color layer 13 and the counter pixel electrode 14 are not limited to the configurations of the figures. Another fixing method is also applicable as the fixing method of the spherical spheres 30. For example, the following method can be used. A place where the spherical spacers 30 are to be arranged is coated with a photo-curing adhesive member, and thereafter the adhesive members are cured by light irradiation to fix the spherical spacers 30. In this manner, the spherical spacers 30 are firmly fixed to the CF substrate 10.

Next, the CF substrate on which the spherical spacers 30 are fixed, and the TFT substrate 20 on which the concave portions 26a are formed, are cleaned. Moreover, in Step S4, the formation of an alignment film and a rubbing processing on the alignment film are carried out. That is, polyimide solution to be a material of the alignment film is applied and calcined by using a printing apparatus or the like. After that, the rubbing processing is carried out by unidirectionally rubbing the surface of the alignment film by buff cloth which is wound around a metal rotation roller, or the like. Next, substrate cleaning and substrate drying are carried out for removing residue of the rubbing processing such as fiber scrap of the buff cloth and cut scrap of the alignment film. The alignment film is not shown in FIGS. 2 to 7.

Next, in Step S5, a liquid crystal material is dropped on the TFT substrate 20. Furthermore, in Step S6, the CF substrate 10 is circularly coated with a photo-curing or thermosetting sealant. This circular sealant is formed in the peripheral regions of each of the pixel regions so as to surround the pixel regions. It is to be noted that, as for the drop of the liquid crystal material and the formation of the sealant, it is also possible that the liquid crystal material is dropped on the CF substrate 10 and the sealant is formed on the TFT substrate 20. It is only needed that one of the TFT substrate 20 and the CF substrate 10 is coated with the photo-curing or thermosetting sealant and the liquid crystal material is dropped on the second substrate. As the photo-curing sealant, a sealant which is cured by irradiation of ultraviolet rays can be used.

Next, in Step S7, the TFT substrate 20 and the CF substrate 10 are superposed. That is, an alignment operation is carried out in such a manner that both substrates are opposed to each other and an alignment mark which has been formed on both substrates in advance is recognized by a camera. In this alignment operation, in the present embodiment, the spherical spacers 30 are used as a spacer member. Accordingly, the friction resistance is reduced so as to facilitate the alignment operation. In addition, by engaging the spherical spacer 30 and the concave portion 26a with each other, a positional relation between both substrates can be defined. Accordingly, both substrates can be superposed with high precision. For example, the TFT substrate 20 and the CF substrate 10 can be superposed with an error within ±1 µm.

Next, in Step S8, the sealant is cured. That is, the superposed substrates are transported for curing the sealant by carrying out irradiation of ultraviolet rays or heating processing. At that time, in the present embodiment, the spherical spacer 30 and the concave portion 26a are engaged with each other. For this reason, even though force from the surface direction of the substrate is applied at the time of the transportation or the curing, misalignment of the substrates can be prevented. With this, the LCD panel 1 in which the substrates are superposed within the standard can be manufactured. In this manner, the LCD panel 1 is completed as shown in FIG. 2, in which the TFT substrate 20 and the CF substrate 10 are bonded with each other with the liquid crystal layer 40 held between the TFT substrate 20 and the CF substrate 10.

In addition, in the present embodiment, the spherical spacers 30 which are excellent in elasticity are used as a spacer member, and the size of the spherical spacer 30 can be enlarged just for fitting in the depth of the concave portion 26a. Accordingly, the gap change due to temperature change can be effectively absorbed.

Figure 3:
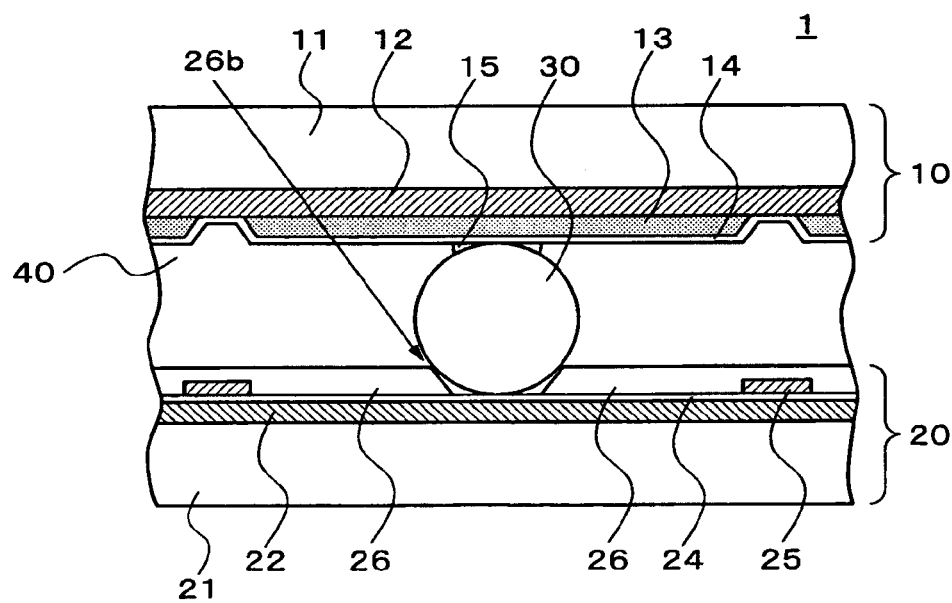
FIG. 3 is a cross-sectional view schematically showing a second structure of the LCD panel according to the exemplary embodiment of the present invention.
Figure 4:
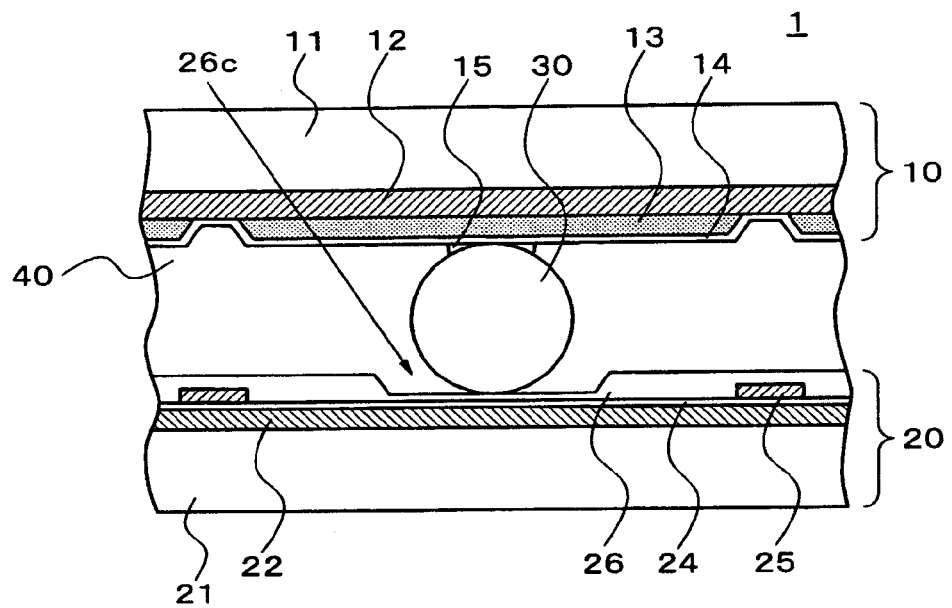
FIG. 4 is a cross-sectional view schematically showing a third structure of the LCD panel according to the exemplary embodiment of the present invention.

In FIG. 2, the size of each of the concave portions 26a is larger than that of the spherical spacer 30. However, the size of each of the concave portions 26a can be arbitrarily set according to the precision of superposing the CF substrate 10 and the TFT substrate 20. For example, as shown in FIG. 3, concave portions 26b may be designed each having a size causing the spherical spacer 30 to come in contact with a bottom surface and a side wall portion of each of the concave portions 26b. In addition, in FIGS. 2 and 3, the concave portions 26a and 26b are formed in a manner that the insulating film 26 is removed to expose the gate insulating film 24 under the insulating film 26 to the outside. However, for example, as shown in FIG. 4, it is possible that the insulating film 26 is not completely removed and concave portions 26c are formed by half-etching in a manner that the insulating film 26 is thinly left on the bottom portion. In addition, each of angles of inclinations of the side walls 26a, 26b and 26c of the concave portion is arbitrary set, and may be a right angle in relation to the surface of the substrate. However, when the side wall portions are inclined, it can become easier to cause the spherical spacers 30 to fall into the corresponding concave portions along the side wall portions.

Figure 5:
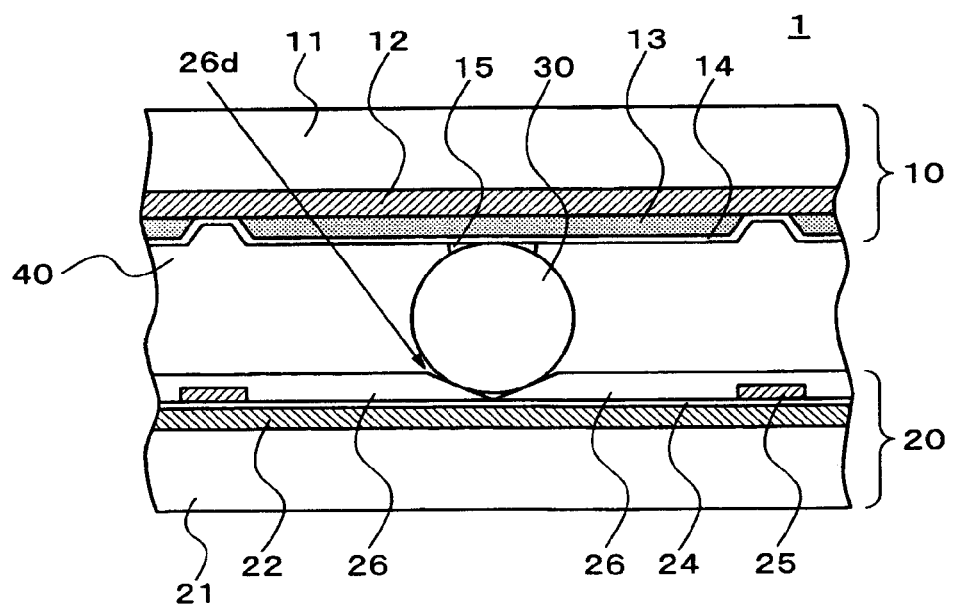
FIG. 5 is a cross-sectional view schematically showing a fourth structure of the LCD panel according to the exemplary embodiment of the present invention.

Furthermore, in FIGS. 2 to 4, each of the concave portions 26a, 26b and 26c, which engages with the spherical spacer 30, is configured of the bottom surface parallel to the surface of the substrate and the side wall portion inclined at the predetermined angle. However, the concave portion may be any shape as long as it is capable of engaging with the spherical spacer 30. For example, the concave portion may be V-shaped like a concave portion 26d as shown in FIG. 5, which touches the spherical spacer 30 on two faces thereof. In this configuration, a load is applied between the two substrates opposite to each other as well. Accordingly, once two substrates are superposed in a manner that the concave portion 26d having a V shape engages with a top portion of the spherical spacer 30, force works so that the top portion of the spherical spacer 30 comes closer to the deepest portion of the V-shaped groove. For this reason, it becomes possible to superpose two substrates more precisely than the configuration of FIG. 2.

Figure 6:
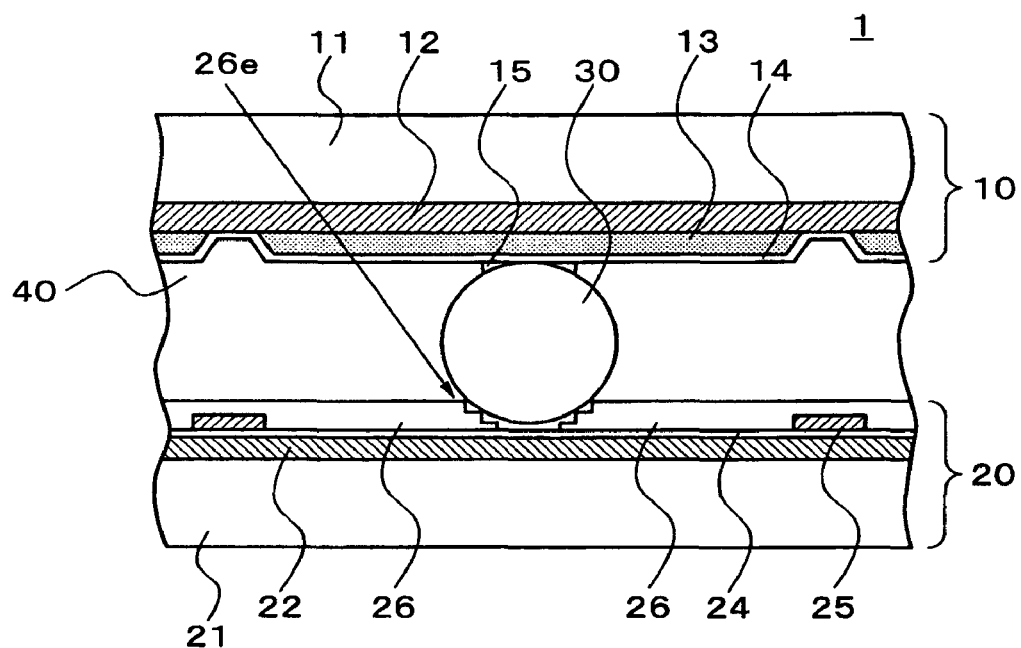
FIG. 6 is a cross-sectional view schematically showing a fifth structure of the LCD panel according to the exemplary embodiment of the present invention.

In addition, for example, as shown in FIG. 6, the concave portion may be of a stepped shape in which an aperture area gradually becomes smaller in a depth direction. In this configuration as well, once two substrates are superposed in a manner that the vertex portion of the spherical spacer 30 fits in a concave portion 26e, force works so that the top portion of the spherical spacer 30 comes closer to the deepest portion of the stepped shape. For this reason, a position for superposing can be obtained with high precision. The stepped shape can be easily formed by using the photolithography of a several times.

Figure 7:
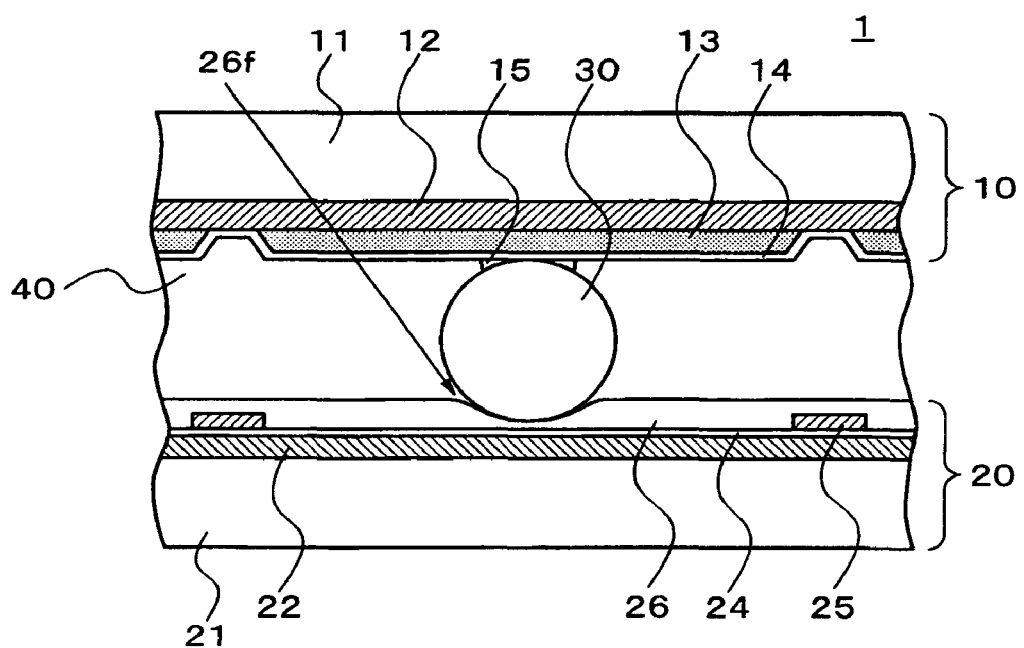
FIG. 7 is a cross-sectional view schematically showing a sixth structure of the LCD panel according to the exemplary embodiment of the present invention.

Still furthermore, the two touching surfaces are not necessarily limited to be planes, but similar effects can be obtained by using a curved surface shape. As shown in FIG. 7, a concave portion 26f having a curved surface shape may be also possible. This curved surface shape can be easily obtained by the photolithography and overheating and melting, of a photosensitive organic film. In a pattern after a photosensitive organic film is coated, exposed, and developed, an edge portion is generated. In some case, the edge becomes an inversely tapered shape, depending on the conditions of exposure and development. As the overheating and melting, for example, heating processing at approximately 120 to 140° C. is carried out for about 2 to 3 minutes after the development. By this heating processing, the edge portion of the organic film pattern is softened, and thus a curved surface shape can be obtained. To this end, the heating processing at 200 to 240° C. is carried out for about one hour to complete the curing processing of the photosensitive organic film.

In this manner, the spherical spacers 30 are fixed to the CF substrate 10 configuring the LCD panel 1, and the concave portion 26a, 26b, 26c, 26d, 26e or 26f, which is formed by partially removing the insulating film 26, is provided in the portion opposite to the spherical spacer 30 on the TFT substrate 20, friction resistance at the time of the contact can be smaller so that alignment of the substrates can be easily carried out. In addition, by engaging the spherical spacer 30 and the concave portion, misalignment at the time of the transportation or at the time of the curing of the sealing material can be suppressed. Accordingly, light leakage due to the misalignment can be surely prevented. In addition, the sphere spacer 30, which is more excellent in elasticity than a columnar spacer, is used as a spacer, and a diameter of the spherical spacer 30 can be enlarged just for fitting in the depth of the concave portion. Accordingly, a margin for gap change can be widened, so that gap irregularity due to temperature change can be surely prevented.

The preferred embodiments are described above. However, the present invention is not limited to the above-described embodiments, and various modifications and applications are possible. For example, in the above-described embodiments, the spherical spacers 30 are fixed to the CF substrate 10. However, the present invention is not limited to the above-described embodiments. Similar effects can be obtained even when the spherical spacers 30 are fixed to the TFT substrate 20, the insulating film is formed on the CF substrate 10 and the concave portions are formed in the insulating film.

Moreover, further modification to the method of manufacturing an LCD panel is available. Next, another method of manufacturing an LCD panel of an embodiment of the present invention will be described by referring to FIG. 1D. The method is one modification of the first embodiment described above. Firstly, in Step S1, a TFT substrate is prepared in the same manner as the first embodiment described above. That is, a gate wiring is formed on a glass substrate. Gate light-shielding portions for shielding leak light from the periphery of the pixel are also formed at the same time. Next, a gate insulating film is formed, and a semiconductor layer is formed thereon. Furthermore, drain wirings are formed. Next, an insulating film is formed. Concave portions are formed in the insulating film by using a photolithography technique, or an etching technique. These concave portions come in contact with the corresponding spherical spacers when the two substrates opposite to each other are superposed. After that, pixel electrodes are formed. The TFT substrate is completed in the same manner as the first embodiment.

Next, in Step S2, the CF substrate is prepared in the same manner as the first embodiment described above. That is, in a region between pixels on the glass substrate, the black matrix layer is formed, and thereafter a color layer for each of RGB colors is formed in each of the pixel regions. Furthermore, a counter pixel electrode is formed. The CF substrate is completed in the same manner as the first embodiment.

Next, the CF substrate, and the TFT substrate on which the concave portions are formed, are cleaned. Moreover, in Step S3*e*, the formation of an alignment film and a rubbing processing on the alignment film are carried out. That is, polyimide solution to be a material of the alignment film is applied and calcined by using a printing apparatus or the like. After that, the rubbing processing is carried out by unidirectionally rubbing the surface of the alignment film by buff cloth which is wound around a metal rotation roller, or the like. Next, substrate cleaning and substrate drying are carried out for removing residue of the rubbing processing such as fiber scrap of the buff cloth and cut scrap of the alignment film.

Next, in Step S4*e*, the spherical spacers are fixed to the CF substrate. Here, each of the spherical spacers is fixed to the counter pixel electrode via the alignment film in a predetermined position where light is shielded from entering by the black matrix layer.

Next, in Step S5, a liquid crystal material is dropped on the TFT substrate in the same manner as the first embodiment described above. Furthermore, in Step S6, the CF substrate is circularly coated with a photo-curing or thermosetting sealant in the same manner as the first embodiment described above. This circular sealant is formed in the peripheral regions of each of the pixel regions so as to surround the pixel regions. It is to be noted that, as for the drop of the liquid crystal material and the formation of the sealant, it is also possible that the liquid crystal material is dropped on the CF substrate and the sealant is formed on the TFT substrate. It is only needed that one of the TFT substrate and the CF substrate is coated with the photo-curing or thermosetting sealant and the liquid crystal material is dropped on the second substrate. As the photo-curing sealant, a sealant which is cured by irradiation of ultraviolet rays can be used.

Next, in Step S7, the TFT substrate and the CF substrate are superposed in the same manner as the first embodiment described above. That is, an alignment operation is carried out in such a manner that both substrates are opposed to each other and an alignment mark which has been formed on both substrates in advance is recognized by a camera. In this alignment operation, in the present embodiment, the spherical spacers are used as a spacer member. Accordingly, the friction resistance is reduced so as to facilitate the alignment operation. In addition, by engaging the spherical spacer and the concave portion with each other, a positional relation between both substrates can be defined. Accordingly, both substrates can be superposed with high precision. For example, the TFT substrate and the CF substrate can be superposed with an error within ±1 μm.

Next, in Step S8, the sealant is cured in the same manner as the first embodiment described above. That is, the superposed substrates are transported for curing the sealant by carrying out irradiation of ultraviolet rays or heating processing. At that time, in the present embodiment, the spherical spacer and the concave portion are engaged with each other. For this reason, even though force from the surface direction of the substrate is applied at the time of the transportation or the curing, misalignment of the substrates can be prevented. With this, the LCD panel in which the substrates are superposed within the standard can be manufactured. In this manner, the LCD panel is completed, in which the TFT substrate and the CF substrate are bonded with each other with the liquid crystal layer held between the TFT substrate and the CF substrate.

According to the modified method of manufacturing an LCD panel, the rubbing processing on the alignment film are carried, followed by fixing the spherical spacers to the CF substrate. Therefore, the rubbing dusts are merely adhered to the spherical spacers. As the results, LCD panel having a high-contrast characteristic can be manufactured.

In addition, the configuration of a pair of the substrates is not limited to the combination of the TFT substrate and the CF substrate. The present invention can be also applied to an LCD panel having the combination of an active matrix substrate and an opposite substrate. For example, it is also possible that the active matrix substrate uses a switching element such as MIM element (Metal Insulator Metal element), other than TFT. The color filter for carrying out color display may be formed on the opposite substrate like the above-described embodiment, or may be formed on the active matrix substrate. In addition, the present invention can be also applied to an LCD panel without color filters, which carries out monochrome display. In addition, the lighting method is not particularly limited, and the LCD panel may be a transmissive type, a reflective type, or a transflective type. In addition, in the above-described embodiments, the description is made by using a One drop fill method. However, a liquid crystal injecting method may be used, in which a liquid crystal material is injected between a pair of substrates after the substrates are bonded with each other.

The present invention can be applied not only to an LCD panel but also to an apparatus in which a gap between a first and a second substrates is defined by a spacer.

Although preferred embodiments of the invention has been described with reference to the drawings, it will be obvious to those skilled in the art that various changes or modifications may be made without departing from the true scope of the invention.

What is claimed is:

1. A method of manufacturing a liquid crystal display panel including a pair of substrates opposite to each other, which hold a liquid crystal layer therebetween, the method comprising the steps of:
   fixing a substantially spherical spacer to a first one of the substrates;
   forming a concave portion in a position in a second one of the substrates, the position being opposite to the spacer; and
   bonding the pair of the substrates with each other in a state where the liquid crystal layer is held therebetween.

2. The method of manufacturing a liquid crystal display panel according to claim 1, wherein the pair of the substrates are bonded with each other in a state where the spacer and the concave portion are engaged with each other.

3. The method of manufacturing the liquid crystal display panel according to claim 2, wherein the bonding step includes the step of superposing the pair of the substrates in a state where the spacer and the concave portion are engaged with each other, and of aligning the pair of the substrates with each other.

4. The method of manufacturing a liquid crystal display panel according to claim 2, wherein
   the concave portion has a side wall portion inclined at a predetermined angle to a plane of the second substrate, and
   a cross-section of the concave portion in a direction substantially perpendicular to the plane is V-shaped.

5. The method of manufacturing a liquid crystal display panel according to claim 2, wherein the concave portion has a stepped shape in which an area of an aperture of the concave portion gradually becomes smaller toward a bottom surface thereof.

6. The method of manufacturing a liquid crystal display panel according to claim 2, wherein
   an insulating film is formed in the second substrate, and
   the concave portion is formed by removing a part of the insulating film.

7. The method of manufacturing the liquid crystal display panel according to claim 6, wherein
   the concave portion penetrates the insulating film, and
   a ground of the insulating film is exposed to the outside.

8. The method of manufacturing a liquid crystal display panel according to claim 2, wherein
   the insulating film is a photosensitive organic film, and
   at least a part of the concave portion is formed of a curved surface.

9. The method of manufacturing a liquid crystal display panel according to claim 2, wherein the fixing step includes:
   the step of coating the first substrate with an adhesive member; and
   the step of fixing the spacer to the adhesive member.

10. The method of manufacturing a liquid crystal display panel according to claim 2, wherein
    a black matrix layer shielding light from entering interstices between a plurality of pixels is formed on the first substrate, and
    the spacer is fixed over the black matrix layer.

11. The method of manufacturing a liquid crystal display panel according to claim 3, wherein the concave portion has a bottom surface substantially parallel to a plane of the second substrate and a side wall portion substantially perpendicular to the plane or inclined at a predetermined angle to the plane.

12. The method of manufacturing a liquid crystal display panel according to claim 1, wherein
    the substantially spherical spacer is fixed to the first substrate, followed by forming an alignment film over the first substrate.

13. The method of manufacturing a liquid crystal display panel according to claim 12, wherein the fixing step includes:
    the step of coating the first substrate with an adhesive member; and
    the step of fixing the spacer to the adhesive member.

14. The method of manufacturing a liquid crystal display panel according to claim 1, wherein
    an alignment film is formed over the first substrate, followed by fixing the substantially spherical spacer to the first substrate.

* * * * *